United States Patent
Connor et al.

[11] 3,906,729
[45] Sept. 23, 1975

[54] MULTIPLE TURBOCHARGER SYSTEM

[75] Inventors: Donald H. Connor, Chillicothe; John C. McCornack, Peoria, both of Ill.

[73] Assignee: Caterpillar Tractor Company, Peoria, Ill.

[22] Filed: Mar. 25, 1974

[21] Appl. No.: 454,094

[52] U.S. Cl. ............................ 60/600; 60/602
[51] Int. Cl.² ............................... F02D 23/00
[58] Field of Search ..................... 60/598–602, 60/610, 612, 614; 123/119 CB

[56] References Cited
UNITED STATES PATENTS

| | | | |
|---|---|---|---|
| 2,359,615 | 10/1944 | Browne et al. | 60/600 |
| 2,380,777 | 7/1945 | Moss | 60/600 |
| 2,773,348 | 12/1956 | Grieshaber et al. | 60/598 X |
| 3,250,068 | 5/1966 | Vulliamy | 60/602 |
| 3,576,102 | 4/1971 | West | 60/599 |

*Primary Examiner*—Charles J. Myhre
*Assistant Examiner*—William C. Anderson
*Attorney, Agent, or Firm*—Phillips, Moore, Weissenberger Lempio & Strabala

[57] ABSTRACT

A multiple turbocharger system for an engine comprising a first turbocharger and a second turbocharger normally disposed for series operation at low to medium engine speeds and for singular operation of the second turbocharger at high or rated engine speeds. A pressure differential responsive automatic by-pass valve and a check valve provide for automatic shifting of the system mode from multiple to single compressor.

7 Claims, 2 Drawing Figures

MULTIPLE TURBOCHARGER SYSTEM

BACKGROUND OF THE INVENTION

This invention relates to a multiple turbocharger system for engines. In particular, the invention relates to a multiple turbocharger system which provides increased torque at medium to low engine speeds.

Turbochargers having a single stage centrifugal compressor driven by a single stage turbine are widely used to economically increase the power output of engines. Such turbochargers are simple in design and are easily matched to all types of engines at specified operating conditions. However, one of the limitations of these turbochargers is that a particular unit is designed to operate in a predetermined speed range normally close to the rated engine speed, and when the turbocharger speed drops below that range, the output pressure drops off substantially and the turbocharger becomes ineffective to boost engine torque in the medium to low engine speed ranges.

In many engine applications, it is desirable for the engine to increase or maintain its torque, as speed is reduced from rated speed. This is customarily achieved by reducing the torque at rated speed by the fuel system and governor characteristics, and then allowing greater torque to be produced as the speed is decreased. The maintenance or increase of engine torque at engine speeds below those at which the single turbocharger is effective results in improved vehicle performance, for example, by reducing the frequency of gear changing.

Numerous controlled multiple turbocharger arrangements such as those described in U.S. Pat. Nos. 3,150,814; 3,250,068; and 3,576,102 to Evans et al., Vulliamy, and West respectively have been devised to accomplish various types of desirous supercharging. Many of these multiple turbocharger arrangements are characterized by complex configurations and sophisticated control systems for controlling turbocharger operation. Other more simple forms are frequently not effective, particularly in specialized vehicle applications.

SUMMARY AND OBJECTS OF THE INVENTION

The invention provides a multiple turbocharger system for engines including a first turbocharger comprising a first turbine driving an associated air compressor both optimized for the higher speed range of the engine, a second turbocharger comprising a second turbine driving a second associated air compressor both optimized for the low to medium engine speed range, and by-pass valve means for by-passing engine exhaust gases around the second turbine to the first turbine during high speed engine operation. The flow of exhaust gases through the turbocharger system is regulated by pressure-responsive valve means activated by pressure differentials existing between the engine intake manifold and the first turbocharger compressor intake. High speed engine operation resulting in high intake manifold pressure actuates the valve means to direct exhaust gas through the by-pass valve means to the first turbine by-passing the second turbine for single turbocharger operation under these conditions. Medium to low speed engine operation resulting in low manifold pressure actuates the valve means to direct the exhaust gas serially through the second turbine and first turbine for series operation of the turbochargers under these running conditions. Compressed air flow through the system is regulated by check valve means so that during series operation of the turbochargers, compressed air from the first turbocharger is circulated through the air compression means of the second turbocharger prior to delivery to the engine, while during single operation of the first turbocharger, compressed air from this source is delivered directly to the engine. Exhaust gas flow within the system is automatically regulated by by-pass control valve means to provide single turbocharging at higher engine speeds and to provide series operation of the turbochargers below the rated engine speed range to provide increased torque at medium to low engine speed levels. Pressure-relief means are also provided within the system to prevent over-pressure in the single turbocharged system from causing overspeeding of the first turbine and resultant damage.

It is an object of this invention to provide a multiple turbocharger system for an engine which utilizes both turbochargers for series operation at medium to low engine speeds and only one of the turbochargers for singular operation at higher engine speeds.

It is another object of this invention to provide a multiple turbocharger system for an engine which is relatively simple in configuration and which is automatically controlled to maintain a relatively constant or increasing torque over extended engine speed ranges.

It is an additional object of this invention to provide a multiple turbocharger system for an engine which operates efficiently at both high and medium to low engine speeds and which improves medium to low speed engine performance.

It is a further object of this invention to provide a multiple turbocharger system for internal combustion engines which has pressure relief means for relieving pressure within the system to prevent turbine damage caused by overspeeding, and for regulating air discharge therefrom.

Other objects and advantages of the invention will be apparent from the following description and the drawing.

DETAILED DESCRIPTION

Figure 1:
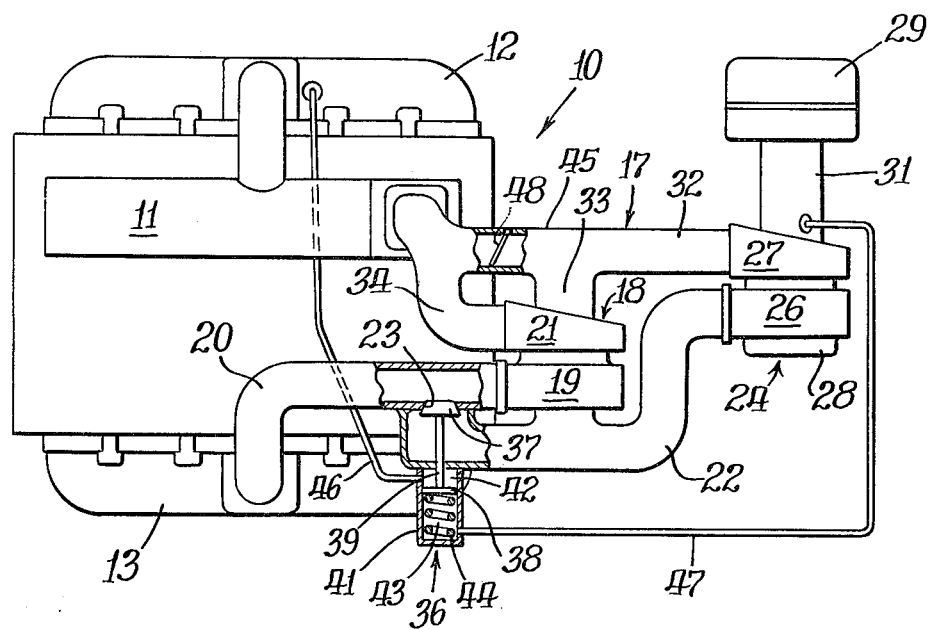
FIG. 1 is a diagrammatic elevation of an internal combustion engine including the multiple turbocharger system of the present invention.

With reference to the drawing, an internal combustion engine such as one used in an earthmover vehicle, is shown generally at 10. It includes an after-cooler 11, an inlet manifold 12, and an exhaust manifold 13.

A dual turbocharger system shown generally indicated at 17 is associated with the engine 10, and includes a turbocharger 18 optimized for low to medium engine speeds. The turbocharger has a turbine 19 which receives discharge exhaust gases from the exhaust manifold 13 through an exhaust conduit 20. The turbine 19 drives a compressor 21. The turbocharger system 17 further includes by-pass means for by-passing engine exhaust gases around the high pressure turbine. Such means include a branch conduit 22 communicating with the exhaust conduit 20 through a passage 23. The branch conduit 22 communicates with the high pressure turbine 19 and receives exhaust gases discharged therefrom. Also included in the system is a turbocharger generally indicated at 24, optimized for high engine speeds. The turbocharger has a turbine 26 which communicates with the branch conduit 22 to receive exhaust gases therefrom. A compressor 27 is driven by the turbine 26. Exhaust gases from the turbine 26 are discharged through an exhaust pipe 28 to the atmosphere.

The compressor 27 draws air through an air cleaner 29 and an intake pipe 31 and delivers the compressed air through a conduit 32 to the after-cooler 11. The conduit means include a compressor inlet portion 33 to the compressor 21 and a compressor outlet portion 34 which delivers the compressed air from the compressor 21 to the after-cooler 11.

First exhaust by-pass control valve means generally indicated at 36 are included within the system 17 for controlling the flow of engine exhaust gases through the passage 23 into the branch conduit 22 in response to a predetermined pressure differential between the inlet manifold 12 and the compressor intake pipe 31. The first control valve means 36 comprise a valve head element 37 seating within the passage 23, and a piston portion 38, secured to the valve element 37 as by a stem 39, and slideably disposed within a valve cage 41. The portion 38 partitions the valve cage or body into a pair of chambers 42 and 43, respectively, connected to conduits 46 and 47. As viewed in FIG. 1, the piston 38 is spring-biased and urges the valve head element 37 to close the passage 23 by means of a spring 44 or the like disposed within the chamber 43.

The first control valve means 36 are responsive by pressure differentials existing between the inlet manifold 12 and the intake pipe 31 which differentials are communicated to the first control valve means by a conduit 46 communicating the inlet manifold 12 with the chamber 42, and by a conduit 47 communicating the intake pipe 31 with the chamber 43.

The system 17 is further provided with check valve means for controlling air flow from the compressor 27 to the after-cooler 11. In the preferred embodiment, a flapper-type check valve 48 is pivotally disposed within the branch passage 45 between the compressor inlet portion 33 and the outlet portion 34.

Figure 2:
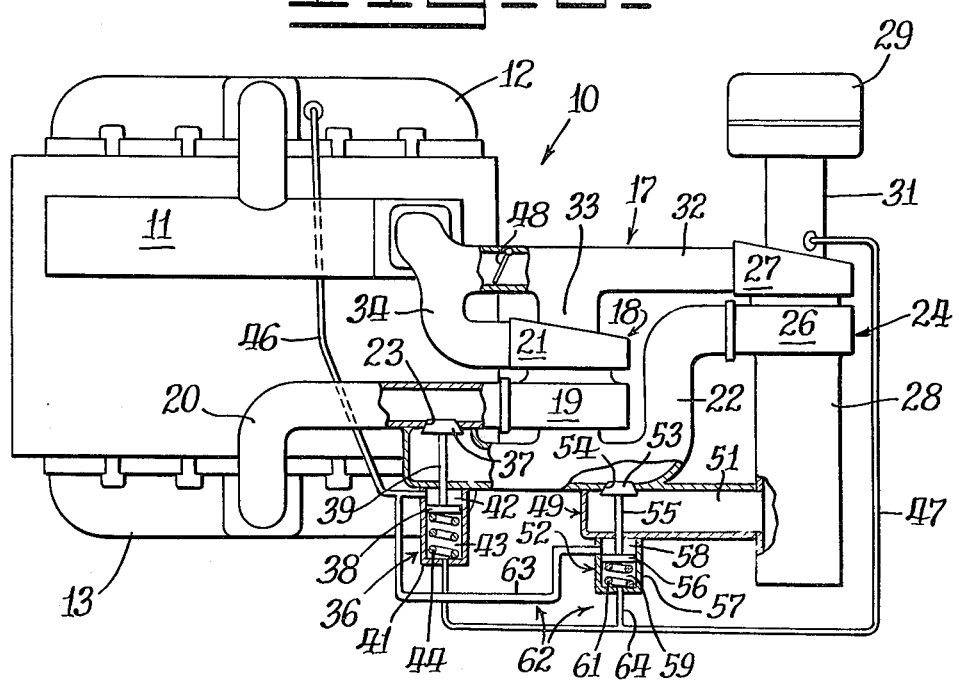
FIG. 2 is a diagrammatic elevation of the engine of FIG. 1 illustrating an alternate embodiment of the multiple turbocharger system of the invention.

An alternate arrangement of the dual turbocharger system of FIG. 1 is illustrated in FIG. 2 and employs corresponding reference numerals to designate like elements of the first embodiment. In the alternate version, however, the system 17 is additionally provided with pressure relief valve means 49 for relieving overpressures within the branch conduit 22 to prevent possible overspeeding of the turbine 26 and for regulating the quantity of air discharged from the compressor 27. The pressure relief means 49 comprise second by-pass means for by-passing engine exhaust gases around the turbine 26. The means include a by-pass conduit 51 communicating the branch conduit 22 with an exhaust pipe extension 28, and pressure-responsive second control valve means shown generally at 52 for regulating the diversion of exhaust gases from the branch conduit to the by-pass conduit.

The second control valve means 52 are generally similar to the first control valve means 36. A valve head element 53 is seated within a passage 54 between the branch conduit 22 and the by-pass conduit 51 and is attached by a stem 55 to a piston portion 56 slideably disposed within a valve cage or body 57. The portion 56 partitions the valve body into a pair of chambers 58 and 59, above and below the piston respectively as viewed in FIG. 2. A spring 61 in the chamber 59 urges the piston 56 and the valve element 53 to seat within and close the passage 54.

The second control valve means 52, like the means 36, respond to pressure differentials extant between the inlet manifold 12 and the compressor intake pipe 31 communicated to the second control valve means by second pressure communication means indicated generally at 62. Such means include a conduit 63 communicating the chamber 58 with the inlet manifold 12 via the conduit 46, and a conduit 64 communicating the chamber 59 with the intake pipe 31 via the conduit 47.

OPERATION

The chamber 42 of the first control valve means 36 is constantly subjected to the air pressure extant in the inlet manifold 12. The pressure within the chamber applies a force to the piston 38 which tends to unseat the valve head 37 and open the passage 23. The chamber 43 is subjected to the air pressure in intake pipe 31 which pressure acts in concert with the spring 44 to urge the piston upwardly to seat the valve head in the passage 23 to close such passage. When the pressure differential between the intake pipe 31 and the inlet manifold 12 reaches a predetermined value, the piston 38 will be driven against the bias of the spring and pressure in chamber 43 to unseat the valve head 37 to permit exhaust to pass through the passage 23. The first control valve means 36 are normally adjusted so that the valve element 37 will be unseated when engine approaches its rated value. Opening the passage 23 permits the exhaust gases to by-pass the turbine 19 of the turbocharger 18 and pass directly to the turbine 26 of the turbocharger 24. The pressure of the exhaust gases passing through the first control valve means 36 drops sufficiently so that the speed of the turbine 19 is greatly reduced to an idle sufficient only to keep the bearings and the oil seals functioning properly in the turbocharger 18.

System inlet air is drawn into the compressor 27 and is directed through the conduit 32 to the after-cooler 11. Since the turbine 19 is doing substantially no work with the valve 37 unseated, there is no pressure rise across the compressor 21. Thus, the air pressure within the conduit 32 opens the check valve 48 and permits air to by-pass the compressor 21 and proceed directly from the conduit 32 to the after-cooler 11 and to the manifold 12. In this mode, the dual turbocharger system is operating at rated speed as a single turbocharged system charged only by the turbocharger 24.

When an external load is applied to the engine 10 and its speed is decreased below a predetermined level, the turbocharger 24 slows and the pressure in the inlet manifold 12 decreases. With such low manifold pressure, the pressure differential between chambers 42 and 43 changes and the piston 38 moves with the valve head 37 upwardly to close the passage 23. When this occurs, all the exhaust gases from the manifold 13 are directed first through the turbine 19 of the turbocharger 18 and then through the turbine 26 of the turbocharger 24. In this mode, the turbochargers are operating in series.

With turbine 19 now doing work, the outlet portion 34 of the compressor 21 is pressurized and is effective to close the check valve 48 so that all air flow from the compressor 27 is directed through the compressor 21 before passage through the after-cooler 11 to inlet manifold 12 of the engine 10.

If such external load is removed or reduced so that engine speed increases, the first control valve means 36 again operates to permit exhaust gases to by-pass the turbocharger 18 and go directly to the turbocharger 24 so that the system functions as a single turbocharged system as previously described.

The second control valve means 52 of the alternate embodiment shown in FIG. 2 operates similarly to the first control valve means 36, and serves to prevent the turbocharger 24 from overspeeding when the engine is operating at high speed, high load conditions. The second control valve means 52 responds to an existing prssure differential between the inlet manifold 12 and the intake pipe 31 and is adjusted to open when a predetermined pressure differential exists. Sufficiently high pressures within the inlet manifold 12 in combination with sufficiently low pressures in the intake pipe 31 cause the control valve means 52 to open, unseating the valve element 53, and permitting a predetermined amount of exhaust gas through the passage 54 into the by-pass conduit 51. The gas then exhausts through the exhaust pipe extension 28, thereby by-passing the turbine 26. Both the speed of the turbine 26 and quantity of air discharged from the compressor 27 may be thusly regulated.

As increased loading is placed upon the engine, or the engine speed is otherwise decreased, the available energy from the exhaust gases is decreased, causing a decrease in the speed of the turbocharger 24. The pressure in the inlet manifold 12 thus will decrease, closing the second control valve means 52 and the passage 54, which will direct all the exhaust gases to the turbine 26. In this condition, the multiple turbocharger system would operate identically to that of the previously described primary embodiment.

While the invention has been described with particular reference to the preferred embodiments, it is apparent that variations and modifications are possible within the purview of the inventive concepts. No limitations with respect to such variations and modifications is intended, except by the scope of the appended claims.

We claim:

1. A multiple turbocharging system for an engine having an intake manifold and an exhaust manifold, said system comprising; first turbocharger means for compressing engine intake air, fluid communication means communicating said first turbocharger means with said exhaust manifold and with said intake manifold, second turbocharger means for compressing engine intake air, said fluid communication means further communicating said second turbocharger means with said intake manifold and said exhaust manifold, first by-pass means in said fluid communication means for selectively permitting the diversion of exhaust gases from said exhaust manifold around said scond turbocharger means to said first turbocharger means, said first turbocharger means including a first air compressor having first inlet and outlet means, said first inlet means for receiving ambient air and said first outlet means for passing compressed air from said first air compressor, said first by-pass means including normally closed first valve means in said fluid communication means between said exhaust manifold and said second turbocharger means for permitting said diversion of exhaust gases when in open condition and for preventing said diversion when closed, said first valve means includng chamber means, a first conduit communicating said first inlet means with said chamber means, a second conduit communicating said intake manifold with said chamber means, said first valve means being responsive to the pressure extant in said chamber means for opening and closing said first valve means to permit and prevent respectively said diversion of exhaust gases around said second turbocharger means, said first turbocharger means further including a first turbine for driving said first compressor, said first turbine having first turbine inlet and outlet means, said second turbocharger means including a second air compressor having second inlet and outlet means and further including a second turbine for driving said second air compressor, said second turbine having second turbine inlet and outlet means, second by-pass means for selectively permitting the diversion of engine exhaust gases from said exhaust manifold around said first turbine from said first turbine inlet means to said first turbine outlet means without operative passage through said first turbine.

2. The invention of claim 1 wherein said chamber means include first and second chambers, said second conduit being connected to said first chamber and said first conduit being connected to said second chamber, spring means in said second chamber for constantly biasing said first valve means toward its normally closed condition.

3. The invention of claim 1 wherein said first outlet means is communicated directly with said second inlet means, said second outlet means being communicated directly with said intake manifold, branch passage means communicating said first outlet means and said second inlet means with said intake manifold, said branch passage means also being communicated with said second outlet means, oneway valve means in said branch means for permitting air flow from said first outlet means to said intake manifold and preventing air flow from said intake manifold to said first outlet means and said second inlet means.

4. The invention of claim 3 wherein said one-way valve means include a flapper-type check valve pivotally mounted within said branch passage.

5. The invention of claim 3 wherein at engine idle speed said first valve means and said one-way valve means are closed and said first and second turbocharger means are operative in series to compress air for said intake manifold, said first valve means automatically operative to open to provide by-passing of said second turbocharger means such that only said first turbocharger is effective to compress air for said intake manifold upon the attainment of rated engine speed.

6. The invention of claim 1 wherein said second by-pass means include normally closed second valve means permitting said diversion around said first turbine when in open condition and for preventing said diversion around said first turbine when closed, said second valve means including further chamber means, a third conduit communicating said further chamber means with said second conduit, a fourth conduit communicating said further chamber means with said first conduit, said second valve means being responsive to the pressure extant in said further chamber means for opening and closing said second valve means to respectively permit and prevent said diversion around said first turbine.

7. The invention of claim 6 wherein said further chamber means include third and fourth chambers said third conduit being connected to said third chamber and said fourth conduit being connected to said fourth chamber, biasing spring means in said fourth chamber for constantly biasing said second valve means toward its normally closed condition.

* * * * *